United States Patent Office 3,707,549
Patented Dec. 26, 1972

3,707,549
α-SUBSTITUTED HYDROCINNAMIC ACIDS AND DERIVATIVES THEREOF
Jack Mills, Indianapolis, Ind., assignor to Eli Lilly and Company, Indianapolis, Ind.
No Drawing. Continuation-in-part of application Ser. No. 516,708, Dec. 27, 1965. This application Dec. 5, 1967, Ser. No. 687,996
Int. Cl. C07c 149/40
U.S. Cl. 260—470  7 Claims

ABSTRACT OF THE DISCLOSURE

Novel α-substituted hydrocinnamic acids and derivatives thereof useful to reduce serum cholesterol and triglyceride levels and to block blood-platelet clumping when administered to animals.

CROSS-REFERENCE

This application is a continuation-in-part of our prior application Ser. No. 516,708, filed Dec. 27, 1965, now abandoned.

SUMMARY

This invention relates to novel α-substituted hydrocinnamic acids and derivatives thereof, and to certain novel intermediates useful in the preparation thereof. More particularly, this invention relates to compounds of the formula:

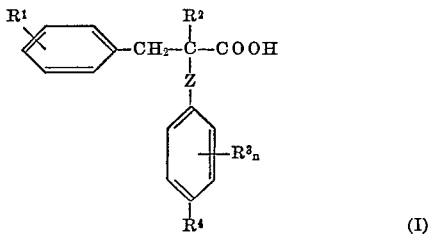

wherein
$R^1$ is hydrogen, halo, lower alkyl, or lower alkoxy;
$R^2$ is hydrogen or methyl;
$R^3$ is halo;
$n$ is 0 to 1;
$R^4$ is hydrogen, halo, lower alkyl, lower alkoxy, phenyl, or phenoxy; and
Z is oxygen or sulfur;
the salts thereof with alkali metals, alkaline earth metals, or ammonium; and
the lower alkyl or di(lower alkyl)amino lower alkyl esters thereof.

Lower alkyl can be illustratively methyl, ethyl, n-propyl, isopropyl, n-butyl, sec.-butyl, or t-butyl.

Di(lower alkyl)amino lower alkyl can be illustratively dimethylaminomethyl, diethylaminoethyl, dimethylaminopropyl, di-n-propylaminoethyl and the like.

Halo can be illustratively chloro, bromo, iodo, or fluoro.

Lower alkoxy can be illustratively methoxy, ethoxy, n-propoxy, n-butoxy, isopropoxy, isobutoxy, sec.-butoxy, and t-butoxy.

Among the compounds of the invention are the following:

α-Methyl-α-(m-tolyloxy)-3-chlorohydrocinnamic acid,
α-Methyl-α-(m-anisyloxy)-2-bromohydrocinnamic acid,
t-Butyl-α-methyl-α-(m-chlorophenylmercapto)-3-methylhydrocinnamate,
t-Butyl-α-methyl-α-(2,4-dibromophenylmercapto)-2-bromohydrocinnamate,
Ethyl α-methyl-α-(4-bromophenoxy)-2-methylhydrocinnamate,
Methyl α-methyl-α-(4-phenoxyphenoxy)-3-bromohydrocinnamate,
n-Propyl α-(4-phenylphenylmercapto)-2-chlorohydrocinnamate,
α-(4-chlorophenoxy)-3-methoxyhydrocinnamic acid,
t-Butyl α-methyl-2-(chlorophenylmercapto)-2-bromohydrocinnamate,
α-Methyl-α-(4-methoxyphenoxy)-2-chlorohydrocinnamic acid, sodium salt,
α-(4-chlorophenylmercapto)-3-chlorohydrocinnamic acid, potassium salt,
α-Methyl-α-(4-chlorophenylmercapto)-3-methoxyhydrocinnamic acid, ammonium salt,
Ethyl α-methyl-α-(4-chlorophenylmercapto)hydrocinnamate,
α-Methyl-α-(2,4-dichlorophenoxy)hydrocinnamic acid, calcium salt,
Ethyl α-methyl-α-(4-chlorophenoxy)hydrocinnamate,
and the like.

The novel hydrocinnamic acids, and salts and esters thereof of this invention have useful pharmacological properties. When administered orally to rats at a dosage of from about 4 mg./kg. to about 80 mg./kg., they demonstrate the significant and highly desirable property of reducing the serum cholesterol and triglyceride levels. Some of the subject compounds also manifest interesting activity as blood-sugar lowering agents when administered orally to rats at dosages of about 50–100 mg./kg. by the method of Root et al., Diabetes 8, 7 (1959).

Certain of the compounds, particularly ethyl α-methyl-α-(4-chlorophenylmercapto)hydrocinnamate, and sodium α-methyl-α-(4-chlorophenylmercapto)hydrocinnamate are active in preventing blood-platelet clumping, thus preventing the formation of thrombi in the blood stream. The compounds have been shown to have this activity when administered orally to mice at dosages in the range of from about 2 mg./kg. to about 30 mg./kg., in corn oil or other suitable medium as a vehicle. The effect has been observed to last for periods of time up to about four hours at the higher dosage.

The active compounds of this invention are readily formulated for oral administration by admixture with suitable excipients and manufacture by known means into tablets, capsules, suspensions, emulsions, dispersible powders, syrups, elixirs, and the like.

The novel compounds of this invention are prepared by a synthesis which makes them available in good yields. The synthesis utilizes as the novel key intermediate a t-butyl ester of the formula

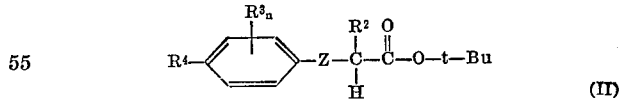

where $R^2$, $R^3$, $n$, $R^4$, and Z have the same meanings as hereinbefore. This ester can be obtained by one of the following procedures:

When $R^2$ represents methyl in the generic Formula II, supra, a lower-alkyl α-halopropionate, for example, ethyl α-bromopropionate or t-butyl α-bromopropionate, is commingled with an appropriate phenol or thiophenol in the presence of a base in a suitable solvent to yield a lower-alkyl α-(aryloxy or arylmercapto) propionate. Suitable bases include potassium carbonate, sodium carbonate, sodium hydroxide, potassium hydroxide, and the like, while suitable solvents include acetone, ethanol, benzene, and the like. In the case where the ester obtained is an ethyl α-(aryloxy or arylmercapto)propionate, it can be suitably purified by distillation at reduced pressure, or omitting the distillation, can be conveniently hydrolyzed under basic conditions to yield an α-(aryloxy or arylmercapto)propionic acid. This acid is then converted to the acid halide and the acid halide allowed to react with t-butyl alcohol to yield t-butyl α-(aryloxy or arylmercapto)propionate, the key intermediate compound, Formula II, supra.

Alternatively, the α-halopropionic acid can be added to an aqueous mixture of a base, for example, sodium or potassium hydroxide, and an appropriate phenol or thiophenol, and the resulting mixture heated for a period of time sufficient to substantially complete the reaction thereof to yield the α-(aryloxy or arylmercapto)propionic acid in the form of its sodium or potassium salt. By acidifying the mixture with, for example, concentrated aqueous hydrochloric acid, the corresponding free acid can be conveniently obtained. The α-(aryloxy or arylmercapto) propionic acid thus obtained can be conveniently converted to its t-butyl ester as previously outlined above.

The novel key intermediate, the t-butyl α-(aryloxy or arylmercapto)propionate, is conveniently alkylated with an appropriate benzyl halide in the presence of an alkali metal amide in excess liquid ammonia to yield a t-butyl α-methyl-α-(aryloxy or arylmercapto)hydrocinnamate. Suitable alkali metal amides include sodium amide, potassium amide, and lithium amide. The ester obtained by this reacttion is hydrolyzed with dilute aqueous acid to yield α-methyl-α-(aryloxy or arylmercapto)hydrocinnamic acid, which can be re-esterified with a lower-alkanol, using any of the methods well known to those skilled in the art, such as the acid-catalyzed reaction with a lower-alkanol. Thus both the substituted hydrocinnamic acid or an ester thereof are readily available.

In a specific example of the synthesis, ethyl α-bromopropionate is allowed to react with a mixture of p-chlorothiophenol, potassium carbonate, and acetone at reflux temperature overnight to yield ethyl α-(4-chlorophenylmercapto)propionate.

While the ethyl ester is preferred at this stage of the synthesis because it may be more easily purified by distillation, if desired, than the t-butyl ester, the t-butyl ester is preferred in the next step of the reaction, because fewer undesired byproducts are formed when it is used. Therefore, the ethyl ester is hydrolyzed by refluxing overnight in a dilute solution of potassium hydroxide in ethanol. The hydrolysis mixture is acidified to precipitate the α-(4-chlorophenylmercapto)propionic acid, which is filtered off, converted to α-(4-chlorophenylmercapto)propionyl chloride by reaction with thionyl chloride, and allowed to react with t-butyl alcohol to yield t-butyl α-(4-chlorophenylmercapto)propionate.

This ester is then conveniently alkylated by allowing it to react with benzyl chloride in the presence of potassium amide in an excess of liquid ammonia to yield t-butyl α-methyl-α-(4-chlorophenylmercapto)hydrocinnamate. Hydrolysis is accomplished by refluxing the ester overnight in a mixture of aqueous 10 percent hydrochloric acid and aqueous 50 percent acetic acid to yield α-methyl-α-(4-chlorophenylmercapto)hydrocinnamic acid.

Other lower-alkyl esters of the thus-obtained cinnamic acid are conveniently prepared therefrom by methods well known to the art, i.e., the acid-catalyzed esterification of the acid using an excess of the appropriate alkanol. For example, using this method, a mixture of α-methyl-α-(4-chlorophenylmercapto)hydrocinnamic acid and a large excess of ethanol is saturated with anhydrous hydrogen chloride gas, and the resulting mixture heated to refluxing overnight. The reaction product mixture is concentrated in vacuo to remove solvent ethanol and hydrogen chloride; the oily residue is washed successively with water, dilute aqueous base, and water, dried and distilled at reduced pressure to yield ethyl α-methyl-α-(4-chlorophenylmercapto)hydrocinnamate.

Suitable alkali metal, alkaline earth metal, or ammonium salts of the substituted hydrocinnamic acids can be prepared by methods well known to the art. For example, α-methyl-α-(4-chlorophenylmercapto)hydrocinnamic acid is dissolved in dilute base, e.g., sodium hydroxide, filtered and cooled. The crystalline material which separates is filtered off and identified as the sodium salt of α-methyl-α-(4-chlorophenylmercapto)hydrocinnamic acid. Other suitable bases useful for preparing the salts include potassium hydroxide, lithium hydroxide, calcium hydroxide, ammonium hydroxide, and the like.

Where R is hydrogen in the generic Formula II, supra, the same general method of preparation previously described is carried out, but with different starting materials. An appropriate phenol or thiophenol is allowed to react with t-butyl chloroacetate in the presence of potassium carbonate and a suitable solvent such as acetone to yield the t-butyl (aryloxy or arylmercapto)acetate.

This ester is alkylated with a suitable benzyl halide in the presence of lithium amide in liquid ammonia to yield the t-butyl α-(aryloxy or arylmercapto)hydrocinnamate. The latter ester in turn can be conveniently hydrolyzed in the same manner as previously described hereinabove using a mixture of dilute (e.g., 10 percent) aqueous hydrochloric acid and aqueous 50 percent acetic acid to yield the α-(aryloxy or arylmercapto)hydrocinnamic acid, Formula I, supra, when R is hydrogen. The lower alkanol esters thereof are readily prepared as described hereinabove.

The following examples describe in detail certain compounds illustruaive of the present invention and methods devised for the preparation thereof. However, the invention is not to be construed as limited thereby either in spirit or in scope since it will be apparent to those skilled in the art that many modifications both of materials and methods may be practiced in the purpose and intent of this disclosure.

EXAMPLE 1 t-Butyl α-(4-chlorophenylmercapto)propionate

To a mixture of 216 g. (1.5 moles) of p-chlorothiophenol, 276 g. of potassium carbonate, and 1100 ml. of acetone, stirred and heated to refluxing, were added dropwise 271 g. (1.5 moles) of ethyl α-bromopropionate; and the reaction mixture was stirred and refluxed overnight.

The reaction product mixture was cooled and the solid material which separated was filtered off. The filtrate was concentrated. The solid material obtained thereby was dissolved in water and the aqueous solution was extracted three times with 500-ml. portions of ether and the ether extracts combined with the concentrated filtrate. The aqueous layer was acidified and extracted with the ether. All the organic layers were combined and washed successively with 500 ml. of water, 100 ml. of aqueous 5 percent sodium hydroxide, and 500 ml. of water, dried, concentrated in vacuo, and distilled to yield ethyl α(4-chlorophenylmercapto)-propionate having a boiling point of about 93–94° C. at 0.01 mm. Yield: 347 g.

*Analysis.*—Calc'd (percent): C, 53.98; H, 5.35. Found (percent): C, 53.84; H, 5.34.

A mixture of 347 g. of the ester, supra, 700 ml. of ethanol and 400 ml. of 10 percent aqueous potassium hydroxide was refluxed overnight. The reaction product mixture was cooled, and concentrated to dryness, and the residue was dissolved in 500 ml. of water and extracted twice with 300-ml. portions of ether to remove the unreacted ester. The aqueous basic layer was acidified with aqueous concentrated hydrochloric acid and extracted with ether. The ether layer was washed with water to a neutral pH, dried, and concentrated to dryness in vacuo. The solid residue thus obtained was recrystallized from a mixture of petroleum ether and ether to yield α-(4-chlorophenylmercapto)-propionic acid having a melting point of about 102.5–103° C. Yield: 283.6 g.

*Analysis.*—Calc'd (percent): C, 49.88; H, 4.18. Found (percent): C, 49.61; H, 4.28.

A mixture of 283.6 g. (1.31 moles) of α(4-chlorophenyl-mercatpo)propionic acid and 180 g. (1.5 moles) of thionyl chloride in 600 ml. of chloroform was refluxed for a time to prepare the acid chloride. The solvent and the excess thionyl chloride were removed in vacuo and the crude acid chloride was added to a cooled solution of 500 ml. of t-butyl alcohol containing 103 g. of pyridine. The reaction mixture was refluxed for two hours, cooled, dissolved in ether, and the ether solution washed successively with 500 ml. of water, 125 ml. of aqueous 5 percent sodium hydroxide solution, and 500 ml. of water, dried, and the solvent removed in vacuo. The residue was distilled to yield t-butyl α-(4 - chlorophenylmercapto)propionate having a boiling point of about 104–105° C. at 0.03 mm. Yield: 294.1 g. $n_D^{24}$=1.5279–1.5290.

*Analysis.*—Calc'd (percent): C, 57.23; H, 6.28. Found (percent): C, 57.38; H, 6.30.

Following this same general procedure and using the appropriate starting materials, the following compounds were prepared:

t-Butyl α-(4-chlorophenoxy)propionate. Boiling point: 98–100° C. at 0.03 mm.

*Analysis.*—Calc'd (percent): C, 60.82; H, 6.67. Found (percent): C, 61.08; H, 6.88.

t-Butyl α-phenoxy)propionate. Boiling point: 85–86° C. at 0.04 mm. $n_D^{24}$=1.4810.

*Analysis.*—Calc'd (percent): C, 70.24; H, 8.16. Found (percent): C, 70.32; H, 8.00.

t-Butyl α-(p-tolyloxy)propionate. Boiling point: 101–102° C. at 0.8 mm. $n_D^{24}$=1.4840.

t-Butyl α(m-chlorophenoxy)propionate. Boiling point: 89–90° C. at 0.04 mm. $n_D^{24}$=1.4909.

*Analysis.*—Calc'd (percent): C, 60.82; H, 6.67. Found (percent): C, 61.06; H, 6.78.

EXAMPLE 2

α-Methyl-α-(4-chlorophenylmercapto)-hydrocinnamic acid

To lithium amide prepared from 6.9 g. 1.08 gram-atom) of lithium and an excess of liquid ammonia was added an ether solution of 294.1 g. (1.08 mole) of t-butyl α-(4-chlorophenyl-mercapto)propionate and the mixture stirred for about 15 minutes. To the resulting mixture was added rapidly with caution an ether solution of 126.5 g. (1.08 moles) of benzyl chloride followed by a liter of anhydrous ether, and the reaction mixture was stirred overnight. A small amount of ethanol (50 ml.) was added to the reaction product mixture to decompose unreacted lithium amide, and the reaction mixture was dissolved in about 500 ml. of ether. The ether solution was washed successively with 200 ml. of water, 250 ml. of aqueous 5 percent sodium hydroxide solution, and 500 ml. of water, then dried and concentrated to dryness. The crude residue was then hydrolyzed using a mixture of 1000 ml. of 50 percent aqueous acetic acid and 500 ml. of aqueous 10 percent hydrochloric acid by refluxing overnight.

The reaction product mixture was cooled and extracted with ether. The ether layer was extracted with 750 ml. of aqueous 5 percent sodium hydroxide and 500 ml. of water. The combined aqueous extracts were acidified with aqueous concentrated hydrochloric acid. The white solid which separated was extracted with ether. The ether layer was washed to neutrality with distilled water, dried, and concentrated in vacuo to dryness, leaving a solid residue. The solid residue thus obtained was recrystallized from a mixture of ether and petroleum ether to yield α-methyl-α-(4-chlorophenylmercapto)hydrocinnamic acid, having a melting point of about 120.5–122.5° C.

*Analysis.*—Calc'd (percent): C, 62.63; H, 4.92. Found (percent): C, 62.45; H, 5.14.

To 70 ml. of aqueous 1 N sodium hydroxide solution were added 21.46 g. of α-methyl-α-(4-chlorophenylmercapto)hydrocinnamic acid with stirring. The mixture was warmed to about 45–50° C. and filtered through a heated sintered-glass funnel. The filtrate was cooled to about 5° C. and the crystalline material which separated was collected on a chilled sintered-glass funnel and washed three times with 15 ml. portions of cold distilled water. The crystalline product was dried in vacuo for 24 hours at about 50° C. The product had a melting point of about 286–294° C. and was identified by potentiometric titration and elemental analysis as the sodium salt of α-methyl-α-(4-chlorophenylmercapto)hydrocinnamic acid.

*Analysis.*—Calc'd (percent): C, 58.45; H, 4.29; Cl, 10.78; S, 9.75; Na, 6.99. Found (percent): C, 57.57; H, 4.44; Cl, 10.96; S, 9.50; Na, 6.66.

Following the same general procedure as in Example 2 and using appropriate starting materials, the following compounds were prepared:

α-Methyl - α - (4-chlorophenoxy)hydrocinnamic acid. Melting point: 100.5–101.5° C.

*Analysis.*—Calc'd (percent): C, 66.09; H, 5.20; Cl, 12.20. Found (percent): C, 66.13; H, 5.37; Cl, 12.29.

α-Methyl - α - (4 - chlorophenoxy)-4-methylhydrocinnamic acid. Melting point: 118–119.5° C.

*Analysis.*—Calc'd (percent): C, 66.99; H, 5.62. Found (percent): C, 67.03; H, 5.77.

α-Methyl-α-(p - tolyloxy)hydrocinnamic acid. Melting point: 78–79° C.

*Analysis.*—Calc'd (percent): C, 75.53; H, 6.71. Found (percent): C, 75.16; H, 6.90.

α-Methyl - α - (3-chlorophenoxy)hydrocinnamic acid. Melting point: 111.5–113° C.

*Analysis.*—Calc'd (percent): C, 66.09; H, 5.20. Found (percent): C, 66.37; H, 5.41.

α-Methyl - α - (4-phenylphenoxy)hydrocinnamic acid. Melting point: 143–145° C.

*Analysis.*—Calc'd (percent): C, 79.49; H, 6.06. Found (percent): C, 78.99; H, 6.00.

α-Methyl - α - (4-chlorophenoxy)-4-methoxyhydrocinnamic acid. Melting point: 75–77° C.

*Analysis.*—Calc'd (percent): C, 63.65; H, 5.34. Found (percent): C, 63.71; H, 5.49.

α-Methyl - α - (4 - chlorophenoxy)-4-chlorohydrocinnamic acid. Melting point: 60–62° C.

*Analysis.*—Calc'd (percent): C, 59.09; H, 4.33. Found (percent): C, 59.40; H, 4.53.

α-Methyl-α-(4 - methoxyphenoxy)hydrocinnamic acid. Melting point: 83–84° C.

*Analysis.*—Calc'd (percent): C, 71.31; H, 6.34. Found (percent): C, 71.07; H, 6.44.

EXAMPLE 3 t-Butyl (4-chlorophenylmercapto)acetate

To a mixture of 144.8 g. (1 mole) of p-chlorothiophenol, 200 g. of potassium carbonate, and 600 ml. of acetone stirred and heated to refluxing were added dropwise 150.6 g. (1 mole) of t-butyl chloroacetate; and the reaction mixture was stirred and refluxed overnight.

The reaction product mixture was cooled, and the solid material which separated was filtered off and discarded. The filtrate was concentrated to dryness at reduced pressure, the residue thereby obtained dissolved in 700 ml. of ether, the solution washed successively with 500 ml. of water and 250 ml. of aqueous 5 percent sodium hydroxide solution. The washed solution was dried, concentrated, and distilled to yield t-butyl (4-chlorophenylmercapto)acetate having a boiling point of about 97–99° C./0.03 mm.; $n_D^{24}$=1.5398. Yield: 105.1 g.

*Analysis.*—Calc'd (percent): C, 56.35; H, 5.91. Found (percent): C, 55.84; H, 5.85.

Following the same general procedure, the following t-butyl esters were prepared:

t-Butyl (p-tolyloxy)acetate. Boiling point: 80–81° C. at 0.05 mm. $n_D^{24}$=1.4995.

*Analysis.*—Calc'd (percent): C, 70.24; H, 8.16. Found (percent): C, 69.00; H, 7.59.

t-Butyl (phenoxy)acetate. Boiling point: 82–83° C. at 0.01 mm. $n_D^{24}$=1.4920.

*Analysis.*—Calc'd (percent): C, 69.20; H, 7.74. Found (percent): C, 69.50; H, 7.72.

t-Butyl (o-chlorophenoxy)acetate. Melting point: 61.5–64° C.

*Analysis.*—Calc'd (percent): C, 59.38; H, 6.22. Found (percent): C, 59.58; H, 6.42.

t-Butyl (p-anisyloxy)acetate. Boiling point: 86–88° C. at 0.01 mm.

*Analysis.*—Calc'd (percent): C, 65.58; H, 7.61. Found (percent): C, 65.79; H, 7.79.

t-Butyl (m-chlorophenoxy)acetate. Boiling point: 77–78° C. at 0.01 mm. $n_D^{24}=1.5077$.

*Analysis.*—Calc'd (percent): C, 59.30; H, 6.23. Found (percent): C, 62.11; H, 6.77.

t-Butyl (2,4-dichlorophenoxy)acetate. Boiling point: 106–108° C. at 0.01 mm. $n_D^{24}=1.5161$.

*Analysis.*—Calc'd (percent): C, 52.00; H, 5.09. Found (percent): C, 52.19; H, 5.22.

t-Butyl (p-tolylmercapto)acetate. Boiling point: 111–112° C. at 0.05 mm. $n_D^{24}=1.5248$.

*Analysis.*—Calc'd (percent): C, 65.52; H, 7.60. Found (percent): C, 65.47; H, 7.50.

t-Butyl (4-chlorophenoxy)acetate. Identified by N.M.R. spectrum.

EXAMPLE 4

α-(4-chlorophenylmercapto)hydrocinnamic acid

To potassium amide prepared from 13 g. (0.34 gram-atom) of potassium and an excess of liquid ammonia was added an ether solution of 100 g. (0.34 mole) of t-butyl (4-chlorophenylmercapto)acetate, and the mixture was stirred for about 15 minutes. To the resulting mixture was added rapidly with caution an ether solution of 43 g. (0.34 mole) of benzyl chloride followed by a liter of anhydrous ether, and the reaction mixture was stirred overnight. A small amount of ethanol (50 ml.) was added to the reaction product mixture to decompose unreacted potassium amide and the reaction mixture was dissolved in about 500 ml. of ether. The ether solution was washed successively with 200 ml. of water, 250 ml. of aqueous 5 percent sodium hydroxide solution, and 500 ml. of water, dried, and concentrated at reduced pressure to leave a residue.

The crude residue, the t-butyl ester, was hydrolyzed following the procedure in Example 1, using a mixture of a aqueous 10 percent hydrochloric acid and aqueous 50 percent acetic acid. The crude solid thus obtained was recrystallized from a mixture of ether and petroleum ether to yield α(4 - chlorophenylmercapto)hydrocinnamic acid having a melting point of about 103.5–105° C.

*Analysis.*—Calc'd (percent): C, 61.53; H, 4.47. Found (percent): C, 61.53; H, 4.65.

Using the general procedure of Example 4, the following compounds were prepared:

α-(4-chlorophenylmercapto) - 4 - chlorohydrocinnamic acid. Melting point: 136–138° C.

*Analysis.*—Calc'd (percent): C, 55.05; H, 3.69. Found (percent): C, 54.45; H, 3.87.

α-(2,4 - dichlorophenoxy)hydrocinnamic acid. Melting point: 86.5–89° C.

*Analysis.*—Calc'd (percent): C, 57.90; H, 3.88. Found (percent): C, 56.18; H, 4.08.

α-(4 - phenylphenoxy)hydrocinnamic acid. Melting point: 152–153.5° C.

*Analysis.*—Calc'd (percent): C, 79.22; H, 5.69. Found (percent): C, 78.94; H, 5.73.

α - (4 - chlorophenoxy)hydrocinnamic acid. Melting point: 112–113° C.

*Analysis.*—Calc'd (percent): C, 65.10; H, 4.73; Cl, 12.81. Found (percent): C, 65.25; H, 4.73; Cl, 12.98.

α-(4 - chlorophenoxy) - 4 - chlorohydrocinnamic acid. Melting point: 127° C.

*Analysis.*—Calc'd (percent): C, 57.89; H, 3.89. Found (percent): C, 57.96; H, 3.86.

EXAMPLE 5

2-diethylaminoethyl α-methyl-α-(4-chlorophenoxy) hydrocinnamate hydrochloride

A mixture of 14.5 g. (0.05 mole) of α-methyl-α-(4-chlorophenoxy)hydrocinnamic acid, 9.5 g. (0.08 mole) of thionyl chloride and 250 ml. of chloroform was refluxed overnight, cooled, concentrated in vacuo, and flushed twice with 200 ml. of benzene to yield α-methyl-α-(4-chlorophenoxy)hydrocinnamoyl chloride.

The crude α-methyl - α - (4 - chlorophenoxy)hydrocinnamoyl chloride thus obtained, dissolved in 50 ml. of dry benzene, was added to a refluxing benzene solution of 8.7 g. (0.06 mole) of β-diethylaminoethanol. The reaction mixture was refluxed for abonut 6 hours, cooled, and dissolved in 250 ml. of benzene. This benzene solution was washed successively with 100 ml. of water, 100 ml. of a saturated aqueous sodium bicarbonate solution, and 100 ml. of water, dried, and concentrated in vacuo to remove the benzene solvent. The residual material was dissolved in 250 ml. of ether and the ether solution saturated with anhydrous hydrogen chloride. The solid precipitate which formed was filtered off and recrystallized from a mixture of ethanol and ether to yield 2-diethylaminoethyl α-methyl - α - (4 - chlorophenoxy)hydrocinnamate hydrochloride as a solid, having a melting point of about 53–55° C.

*Analysis.*—Calc'd (percent): C, 61.97; H, 6.86. Found (percent): C, 61.78; H, 7.65.

EXAMPLE 6

Ethyl α-methyl-α-(4-chlorophenylmercapto) hydrocinnamate

A solution of 100 g. (0.327 mole) of α-methyl-α-(4-chlorophenylmercapto)hydrocinnamic acid in 2 liters of ethanol was saturated with anhydrous hydrogen chloride gas and the reaction mixture heated to refluxing overnight. The reaction product mixture was concentrated in vacuo to remove the ethanol and the oily residue dissolved in about one liter of ether. The ether solution was washed successively once with distilled water, twice with aqueous 5 percent sodium hydroxide solution, and twice with distilled water, dried and distilled to yield ethyl α-methyl-α-(4 - chlorophenylmercapto)hydrocinnamate having a boiling point of about 160–170° C. at 0.05 mm. The structure of the product was confirmed by elemental analyses and the nuclear magnetic resonance spectrum.

Using the general procedure of Example 6, the following compound was prepared:

Ethyl α - (p-tolyloxy)hydrocinnamate. Boiling point: 143–145° C./0.01 mm. $n_D^{24}=1.5379$.

*Analysis.*—Calc'd (percent): C, 76.03; H, 7.08. Found (percent): C, 75.55; H, 7.22.

What is claimed is:

1. A compound of the formula:

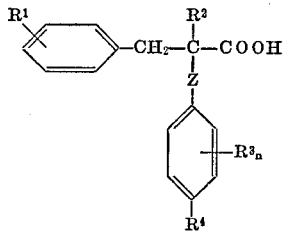

wherein
$R^1$ is hydrogen, halo, lower alkyl, or lower alkoxy;
$R^2$ is methyl;
$R^3$ is halo;
n is 0 or 1;
$R^4$ is hydrogen, halo, lower alkyl, lower alkoxy, phenyl, or phenoxy; and
Z is oxygen or sulfur;

the salts thereof with alkali metals, alkaline earth metals, or ammonium; and the lower alkyl or di(lower alkyl)amino lower alkyl esters thereof.

2. A member selected from the group consisting of a compound of the formula:

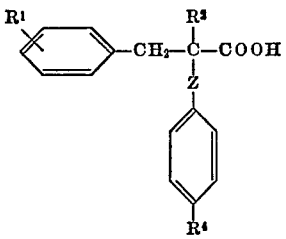

wherein

Z is a member selected from the group consisting of oxygen and sulfur;

$R^4$ is a member selected from the group consisting of halogen, phenyl, and phenoxy;

$R^2$ is methyl;

$R^1$ is a member selected from the group consisting of hydrogen, halogen, lower alkyl and lower alkoxy; and the lower alkyl esters thereof.

3. A compound of the formula:

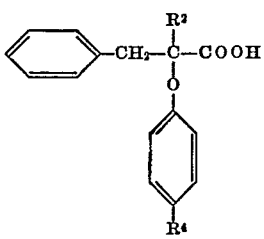

wherein $R^4$ is halogen; and $R^2$ is methyl.

4. A compound as in claim 1, said compound being α-methyl-α-(4-chlorophenylmercapto)hydrocinnamic acid.

5. A compound as in claim 1, said compound being α-methyl-α-(4-chlorophenylmercapto)hydrocinnamic acid sodium salt.

6. A compound as in claim 1, said compound being α-methyl-α-(4-chlorophenoxy)hydrocinnamic acid.

7. A compound as in claim 1, said compound being ethyl α-methyl-α-(4 - chlorophenylmercapto)hydrocinnamate.

References Cited

UNITED STATES PATENTS

| 2,503,296 | 4/1950 | Papa et al. | 260—516 |
| 3,378,582 | 4/1968 | Bolhofer | 260—516 |

FOREIGN PATENTS

| 1,413,900 | 9/1965 | France | 260—470 |

OTHER REFERENCES

Papa et al.: J. Am. Chem. Soc., vol. 69, pp. 3022–3033 (1947).

Hauser et al.: Chem. Abstracts, vol. 51, p. 4996f (1957).

LORRAINE A. WEINBERGER, Primary Examiner

J. F. TERAPANE, Assistant Examiner

U.S. Cl. X.R.

260—473 G, 516, 520; 424—308, 317